United States Patent [19]

Ishizuka et al.

[11] Patent Number: 5,017,777
[45] Date of Patent: May 21, 1991

[54] DIFFRACTED BEAM ENCODER

[75] Inventors: Koh Ishizuka, Urawa; Masaaki Tsukiji, Tokyo; Yoichi Kubota, Kawasaki; Satoshi Ishii, Tokyo; Tetsuharu Nishimura, Kawasaki, all of Japan

[73] Assignee: Canon Kabushiki Kaisha, Tokyo, Japan

[21] Appl. No.: 437,672

[22] Filed: Nov. 17, 1989

[30] Foreign Application Priority Data

Nov. 18, 1988 [JP] Japan ................. 63-291470

[51] Int. Cl.⁵ .............. G01D 5/34; G01B 11/02
[52] U.S. Cl. ................ 250/231.16; 250/237 G; 356/356
[58] Field of Search ......... 250/237 G, 231.13, 231.14, 250/231.16, 225; 33/707; 356/373, 374, 351, 358, 356; 341/13

[56] References Cited

U.S. PATENT DOCUMENTS

| | | | |
|---|---|---|---|
| 3,612,695 | 10/1971 | Bouwhuis et al. | 250/237 G |
| 3,756,723 | 9/1973 | Hock | 250/237 G |
| 4,143,268 | 3/1979 | Marold et al. | 250/237 G |
| 4,629,886 | 12/1986 | Akiyama et al. | 250/237 G |
| 4,676,645 | 6/1987 | Taniguchi et al. | 356/356 |
| 4,792,678 | 12/1988 | Spies | 250/237 G |
| 4,829,342 | 5/1989 | Nishimura | 356/356 |
| 4,868,385 | 9/1989 | Nishimura | 250/237 G |

Primary Examiner—David C. Nelms
Assistant Examiner—Michael Messinger
Attorney, Agent, or Firm—Fitzpatrick, Cella, Harper & Scinto

[57] ABSTRACT

A method for detecting a state of rotation of a rotary scale having a diffraction grating therein in which a radiation beam is directed to a first place on the diffraction grating to generate first and second diffracted beams. The first and second diffracted beams are re-diffracted at the first place to form a first re-diffracted beam and a second re-diffracted beam. The first and second re-diffracted beams are directed to a second place on the diffraction grating substantially opposite the first place with respect to the center of rotation of the rotary scale. The first and second re-diffracted beams are diffracted at the second place to interfere with each other so that an interference beam is formed. The interference beam is converted into a signal to detect the state of rotation of the rotary scale.

34 Claims, 4 Drawing Sheets

DIFFRACTED BEAM ENCODER

BACKGROUND OF THE INVENTION

1. Field of the Invention

The present invention relates to an encoder, and, more particularly, to an encoder in which interference beam is formed by a plurality of diffracted beams generated in a diffraction grating, and the displacement of the above-described diffraction grating is measured by converting the thus formed interference beam into a signal.

2. Related Background Art

Hitherto, encoders of the type described above exhibit excellent resolving power with respect to conventional photoelectric encoders using main scales in which a multiplicity of slits are arranged and index scales in which a plurality of slits are formed. In order to improve the resolving power of the encoder of the type described above, a signal obtained from the interference beam is usually electrically divided so that a multiplicity of pulses are formed in the manner similar to the operation of the conventional photoelectric encoder.

However, the above-described method in which the signal is electrically divided suffers from a unsatisfactory precision. Therefore, an encoder in which a signal exhibiting further improved resolving power (that is, a signal including a multiplicity of pulses) can be directly obtained from the interference beam has been required.

To this end, the applicant of the present invention has disclosed, in U.S. Ser. No. 190,247, an encoder capable of forming an interference beam from the diffracted beams which have been diffracted three times or more in the diffraction grating thereof.

SUMMARY OF THE INVENTION

The present invention relates to an improvement in the encoder which has been previously applied for in U.S. application Ser. No. 190,247. An object of the invention is to provide a small size encoder exhibiting excellent resolving power.

In order to achieve this object, an aspect of the present invention lies in an encoder capable of detecting a state of rotation of a rotary scale having a diffraction grating formed along the direction of rotation of the rotary scale, the encoder comprising: first generating means capable of causing a radiation beam to pass toward a first place of the diffraction grating and capable of generating first and second diffracted beams each of which has been diffracted plural times at this place; means capable of receiving the first and second diffracted beams so as to caused them to pass toward a second place of the diffraction grating which opposes the first place with respect to the center of rotation of the rotary scale; and means capable of converting an interference beam into a signal, the interference signal being formed from a first re-diffracted beam generated as a result of diffraction of the first diffracted beam at the second place and a second re-diffracted beam generated as a result of diffraction of the second diffracted beam at the second place.

Another aspect of the invention lies in an encoder capable of detecting a state of rotation of a rotary scale having a diffraction grating formed along the direction of rotation of the rotary scale, the encoder comprising: first generating means capable of causing a radiation beam to pass toward a first place of the diffraction grating, and generating a first and a second diffracted beam; second generating means capable of causing the first and second diffracted beams to pass to a second place of the diffraction grating different from the first place with respect to the center of rotation of the rotary scale at which the first and second diffracted beams are respectively diffracted plural times, whereby a first re-diffracted beam is generated from the first diffracted beam, and a second re-diffracted beam is generated from the second diffracted beam; and means capable of converting an interference beam formed by the first and second re-diffracted beams into a signal.

A preferred aspect of the present invention lies in an encoder capable of detecting a state of rotation of a rotary scale having a diffraction grating formed along the direction of rotation of the rotary scale, the encoder comprising: means capable of causing a pair of radiation beams to pass toward a first place of the diffraction grating, and emitting a positive diffracted beam from either of the radiation beams and a negative diffracted beam from the other radiation beam with the diffracted beams substantially overlapping to each other; reflection means capable of reflecting the positive and negative diffracted beams so as to cause them to be made incident upon the first place whereby the positive diffracted beam is again diffracted so as to generate a first positive diffracted beam, while the negative diffracted beam is again diffracted so as to generate a second negative diffracted beam; re-incident means capable of receiving the first and second diffracted beams, via the means capable of causing a pair of radiation beams to pass, and causing the first and second diffracted beams to be again made incident upon a second place of the diffraction grating which opposes the first place with respect to the center of the rotary scale, whereby the first diffracted beam is again diffracted so as to generate a first re-diffracted beam and the second diffracted beam is again diffracted so as to generate a second negative re-diffracted beam before being emitted from the second place with substantially overlap; means capable of reflecting the first and second re-diffracted beams so as to be incident upon the second place, whereby the first and second re-diffracted beams are diffracted, so that a predetermined plurality of diffracted beams are generated; and means capable of forming, via the re-incident means, an interference beam from a positive diffracted beam of the plurality of diffracted beams formed from the first re-diffracted beam and a negative diffracted beam formed from the second re-diffracted beam, and converting the interference beam into a signal.

A still further aspect of the present invention, which is an apparatus which can be applied to the above-described aspects, lies in an apparatus capable of measuring the displacement of a diffraction grating comprising: a radiation source; irradiation means capable of separating a radiation beam emitted from the radiation source into first and second beams so as to be applied to a predetermined place of the diffraction grating along individual first and second light paths; reflection means capable of reflecting a first positive diffracted beam generated from diffraction of the first beam at the place and reflecting a second negative diffracted beam generated from diffraction of the second beam at the place so as to cause each of the diffracted beams to pass toward the place, the irradiation means being structured in such a manner that said first and second light paths substantially intersect at the place, and a reflected beam generated from a regular reflection of the first beam at the diffraction grating is not made incident upon the second light path, and a reflected beam generated from a regular reflection of the second beam at the diffraction grating is made incident upon the first light path. The reflection means is structured in such a manner that the first diffraction beam is diffracted at the place so that a first positive re-diffracted beam passing toward the first light path is generated, and the second diffracted beam is diffracted at the place so that a second negative diffracted beam passing toward the second light path is generated. Furthermore, the apparatus further comprises conversion means capable of converting an interference beam formed by the first re-diffracted beam and the second re-diffracted beam into a signal.

A method of detecting a state of rotation structured for the purpose of achieving the objects is capable of detecting a state of rotation of a rotary scale in which a diffraction grating is formed along the direction of rotation of the rotary scale, the method comprising the steps of: a step in which a radiation beam is caused to pass toward a first place on the diffraction grating in which a first and a second diffracted beams are generated; a step in which the first and second diffracted beams are again diffracted at the first place and a first re-diffracted beam is generated from the first diffracted beam and a second re-diffracted beam is generated from the second diffracted beam; a step in which the first and second re-diffracted beams are caused to pass toward a second place which substantially opposes the first place with respect to the center of rotation of the rotary scale; a step in which an interference beam is formed by causing diffracted beams respectively generated by diffracting the first and second re-diffracted beams to interfere with each other at the second place; and a step in which the state of rotation of the rotary scale is detected by converting the interference beam into a signal.

Another method of detecting a state of rotation according to the present invention is capable of detecting a state of rotation of a rotary scale having a diffraction grating formed thereon and along the direction of rotation of the rotary scale, the method comprising the steps of: a step in which first and second diffracted beams are emitted from a first place of the diffraction grating; a step in which the first and second diffracted beams are caused to pass toward a second place of the diffraction grating which opposing the first place with respect to the center of rotation of the rotary scale so that a first re-diffracted beam is generated from the first diffracted beam and a second re-diffracted beam is generated from the second diffracted beam; a step in which the first and second re-diffracted beams are caused to pass toward the second place and an interference beam is formed by causing diffracted beams generated as a result of diffraction of each of the re-diffracted beams to interfere with each other; and a step in which the state of the rotation of the rotary scale is detected by converting the interference beam into a signal.

Another aspect of the present invention capable of being applied to the above-described two detection methods lies in a method of measuring the displacement of a diffraction grating comprising the steps of: a step in which a first radiation beam and a second radiation beam are caused to pass toward the diffraction grating along the corresponding first and second light paths which substantially intersect each other at a predetermined position on the diffraction grating; a step in which a first diffracted beam generated by diffracting the first radiation beam and a second diffracted beam generated by diffracting the second radiation beam are caused to pass toward the place; a step in which a first re-diffracted beam generated by diffracting the first diffracted beam at the place is caused to pass toward the first light path and a second re-diffracted beam generated by diffracting the second diffracted beam at the place is caused to pass toward the second light path; and a step in which an interference beam is formed by causing the first and second re-diffracted beams to interfere with each other, and the interference beam is converted into a signal, so that the displacement is measured, wherein the step in which the radiation beam is caused to pass is carried out in such a manner that a reflected beam generated from a regular reflection of the first radiation beam at the diffraction grating is not made incident upon the second light path, and a reflected beam generated from a regular reflection of the second radiation beam at the diffraction grating is not made incident upon the first light path.

In the above-described aspects of the present invention, a laser beam is employed as the radiation beam. As the light source capable of radiating the beams, a semiconductor laser can be employed to reduce the overall size of the system. In a preferred aspect of the present invention, + 1 order diffracted beams are employed so as to serve as the first diffracted beam and re-diffracted beam, while − 1 order diffracted beams are employed so as to serve as the second diffracted beam and re-diffracted beam. The interference beam can be caused to be brighter by being formed by causing the +1 order diffracted beam formed from the first re-diffracted beam and the −1 order diffracted beam formed from the second re-diffracted beam to interfere with each other.

In an aspect of the present invention, a polarization beam splitter is used for the purpose of obtaining the first and second radiation beams from the radiation beam. In some aspects, the polarization beam splitter is used for overlapping the first and second diffracted beams or overlapping the first and second re-diffracted beams. In the case where the polarization beam splitter is employed for the purpose of dividing and synthesizing the beams, a ¼ wavelength plate is disposed on the light path through which the diffracted beams path. As a result of the action of this ¼ wavelength plate, the diffracted beams can be synthesized with beam loss substantially eliminated.

According to the present invention, the structure of the diffraction grating and the type of the radiation beam are not limited. However, it is preferable that the above-described laser beam be employed as the radiation beam and a phase type diffraction grating be employed as the diffraction grating. The interference beam can be brighter by applying the combination of the above-described preferred components to the present invention.

Furthermore, the diffraction grating which is the subject of the method of measuring the displacement and an apparatus for measuring the displacement, which are the other aspect of the present invention, may be formed on either the rotary scale as shown in the other aspects of the present invention or on a known linear scale. Therefore, the measurement method and the measurement apparatus may be modified variously in accordance with the state of the subject of the measurement or the specifications of the apparatus.

The other features and specific forms of the present invention will be apparent from the embodiments to be described later.

DESCRIPTION OF THE PREFERRED EMBODIMENTS

Figure 1:
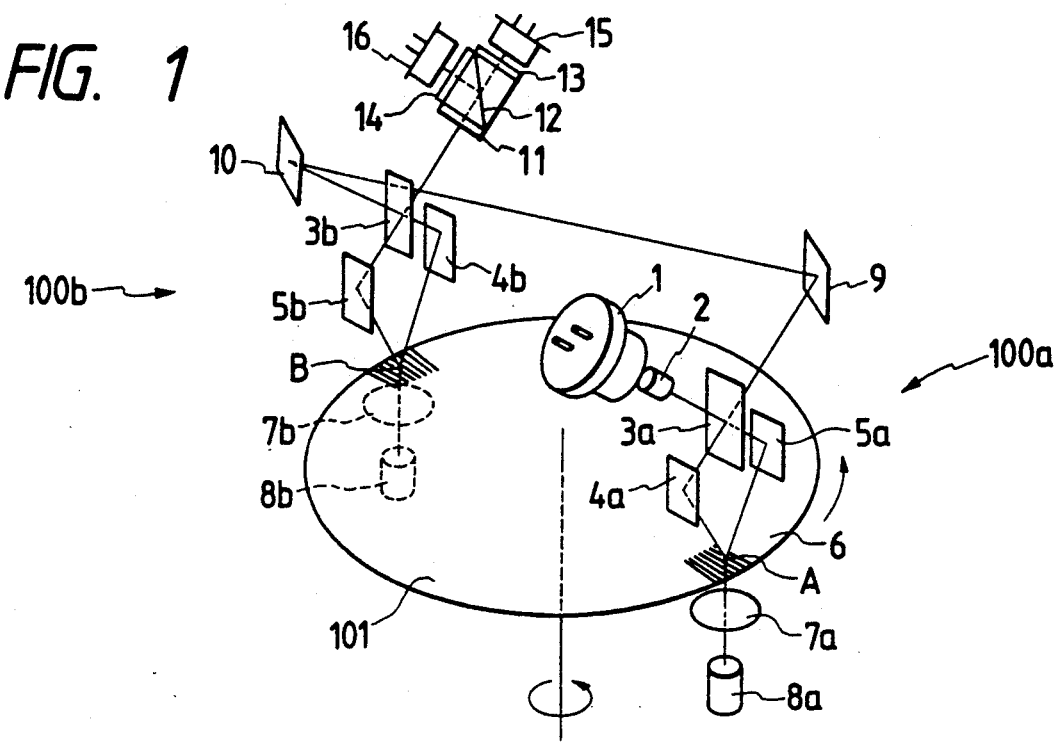
FIG. 1 is a schematic view which illustrate an embodiment of the present invention.

FIG. 1 is a schematic view which illustrates an embodiment of a rotary encoder according to the present invention.

Referring to the drawing, reference numeral 1 represents a light source which comprises, according to this embodiment, a semiconductor laser capable of emitting monochromatic light, where a multi-mode semiconductor laser light source or an LED light source can be employed if they are able to emit light having coherence. Reference numeral 2 represents a collimeter lens capable of converting the laser beams emitted from the light source 1 into parallel luminous fluxes. Reference numeral 3a (3b) represents a polarization beam splitter capable of reflecting the incident luminous flux of the S-polarized component of the incident luminous fluxes made incident thereon, while capable of allowing a beam of the P-polarized component to pass through. Reference numerals 4a (4b) and 5a (5b) respectively represent mirrors, and 6 represents a radial diffraction grating which is disposed in the circumferential portion of a disc 101 (a rotary scale) in the direction of rotation of the disc 101 (in the circumferential direction), the disc 101 serving as the subject whose rotation is to be detected. The diffraction grating 6 displaces in the circumferential direction of the disc 101 when the disc 101 rotates relative to its axis of rotation. The diffraction grating 6 is in the form of a phase type diffraction grating in which concave portions and convex portions are periodically formed, the depth and the height of the concave portions and the convex portions being determined to be a predetermined value relating to the wavelength of the laser beam emitted from the light source 1 in order to reduce the quantity of 0-order diffracted beam generated therein. The diffraction grating 6 may, of course, employ an amplitude type diffraction grating in which shield (reflection) patterns made of chrome or the like are periodically formed.

The mirrors 4a (4b) and 5a (5b) respectively reflect reflected beam (S-polarized light) from the polarization beam splitter 3a (3b) and transmitted beam (P-polarized light) so as to cause the above-described beams to advance to position A which is the first portion on the diffraction grating 6 (position B which is the second position). Therefore, the mirrors 4a (4b) and 5a (5b) orient the light paths through which the beams advance, these light paths being arranged to intersect at the position A (the position B). As illustrated, each of the beams is made incident upon the position A from the reverse side of the disc 101 along a common incident plane including a perpendicular axis of the surface of the disc 101, the beams making the same angle (the incident angle) each other with respect to this axis at the time of incidence. The angle of the incident is determined to correspond to the diffraction angle (deflection angle) of $\pm$ 1-order diffracted beams created by diffracting the above-described beams by the diffraction grating. Therefore, the + 1-order diffracted beam caused from either of the beams and the $-$ 1-order diffracted beam caused by the other beam which are generated when the above-described beams are made incident upon the position A (the position B), are emitted from the diffraction grating 6 along the axial direction overlapped to each other as described later. Reference numeral 7a (7b) represents polarization direction conversion means comprising a $\lambda/4$ plate. Reference numeral 8a (8b) represents reflection means comprising an optical member formed by coating the end surface of a bar-shaped gradient index lens of an end surface imaging type with a reflection layer, the end surface being the surface which is positioned away from the diffraction grating 6.

A system having elements 3a (3b), 4a (4b), 5a (5b), 7a (7b), and 8a (8b) is called a detection unit 100a (100b) here. Thus, a luminous flux under a predetermined state of polarization is transmitted between the above-described detection units 100a and 100b as described later. The positions A and B on the diffraction grating 6 are arranged to be symmetrical with respect to the center of the rotation of the disc 101.

Then, the detection operation conducted by the rotation of the disc 101 will be described.

The laser beams emitted from the light source 1 are caused to substantially run parallel by the collimeter lens so as to pass toward the polarization beam splitter 3a. These parallel beams are divided, by the polarization beam splitter 3a, into two luminous fluxes: a transmitted luminous flux consisting of the P-polarized component and reflected luminous flux consisting of the S-polarized component. The S-polarized luminous flux reflected by the polarization beam splitter 3a is reflected by the mirror 4a before being made incident upon the position A on the diffraction grating 6 on the disc 101 at an angle of incident which corresponds to the diffraction angle ($\theta$) of the $-$ 1-order diffracted beam.

On the other hand, the P-polarized luminous flux which has passed through the polarization beam splitter 3a is reflected by the mirror 5a before being made incident upon the position A on the diffraction grating 6 on the disc 101 at an angle of incident which corresponds to the diffraction angle ($\theta$) of the + 1-order diffracted beam.

The $-$ 1-order transmitted and diffracted beam generated as a result of the diffraction of the S-polarized luminous flux performed in the diffraction grating 6 is emitted from the disc 101 in the substantially perpendicular direction. It then passes through the ¼ wavelength plate 7a, and becomes a circularly polarized beam before being reflected by the reflection means 8a so that it returns through its original light path. It again passes through the ¼ wavelength plate 7a, and is again made incident upon the region A on the diffraction grating 6 in the form of P-polarized luminous flux. As a result of this re-incident, $-$ 1-order transmitted and diffracted beam (P-polarized luminous flux) generated by re-diffraction of the $-$ 1-order transmitted and diffracted beam in the diffraction grating 6 is reflected by the mirror 4a before it passes through the polarization beam splitter 3a.

On the other hand, the + 1-order transmitted and diffracted beam generated as a result of the diffraction of the P-polarized luminous flux in the diffraction grating 6 is emitted from the disc 101 in substantially the perpendicular direction overlapping the − 1-order transmitted and diffracted beam. It then passes through the ¼ wavelength plate 7a, and becomes a circularly polarized beam before being reflected by the reflection means 8a so that it returns through its original light path. It again passes through the ¼ wavelength plate 7a, and is again made incident upon the region A on the diffraction grating 6 in the form of S-polarized luminous flux. As a result of this re-incident, + 1-order transmitted beam generated by re-diffraction of the + 1-order transmitted and diffracted beams in the diffraction grating 6 is reflected by the mirror 5a before it passes through the polarization beam splitter 3a.

Therefore, the two luminous fluxes of the P-polarized and the S-polarized luminous fluxes which have been respectively diffracted twice in the diffraction grating 6 can be taken out at the polarization beam splitter 3a such that the two luminous fluxes are overlapped to each other. The two luminous fluxes are introduced into the mirror 9 through the common light path. The two luminous fluxes which have been introduced into the mirror 9 have planes of polarization which intersect at right angles and overlap each other. The two luminous fluxes are then reflected by the mirrors 9 and 10 and are introduced into the polarization beam splitter 3b of a detection unit 101b structured similarly to the above-described detection unit 101a. The two luminous fluxes which have been divided by the polarization beam splitter 3b are, similarly to the operation in the detection unit 101a, diffracted twice at the position B on the diffraction grating 6 before being taken out through the polarization beam splitter 3b.

That is, the S-polarized + 1-order diffracted beam of the two luminous fluxes made incident upon the polarization beam splitter 3b which has been subjected twice to the + 1-order diffraction at the position A is reflected by the polarization beam splitter 3b. On the other hand, the P-polarized − 1-order diffracted beam which has been subjected twice to the − 1-order diffraction at the position A passes through the polarization beam splitter 3b. The + 1-order diffracted beam is caused to pass toward the mirror 5b, while the − 1-order diffracted beam is caused to pass toward the mirror 4b. The + 1-order diffracted beam is reflected by the mirror 5b, and is made incident upon the position B at a predetermined angle ($\theta$), the position B opposing the position A on the disc 101 with respect to the center of rotation of this disc 101. On the other hand, the − 1-order diffracted beam is also reflected by the mirror 4b, and is made incident upon the position B at the same angle ($\theta$). The + 1-order transmitted and diffracted beam generated by diffracting the + 1-order diffracted beam at the position B and the − 1-order diffracted beam generated by diffracting the − 1-order diffracted beam at the position B emit from the surface of the disc 101 in the substantially perpendicular direction and with overlapped to each other. Each of the diffracted beams is then made incident upon the λ/4 plate 7b where they are respectively converted into circularly polarized beams before they pass toward the reflection means 8b. The reflection means 8b reflects each of the diffracted beams to their light path through which the beams have been made incident. The diffracted beams reflected by the reflection means 8b are again made incident upon the λ/4 plate in which the + 1-order diffracted beam is converted into P-polarized light, while the − 1-order diffracted beam is converted into S-polarized light before being again made incident upon the position B of the diffraction grating 6. Then, the + 1-order transmitted and diffracted beam generated as a result of the diffraction of the + 1-order beam at the position B is caused to pass toward the mirror 5b, while the − 1-order transmitted and diffracted beam generated as a result of diffraction of the − 1-order diffracted beam at the position B is caused to pass toward the mirror 4b. The ± 1-order diffracted beams are reflected by the mirrors 5b and 4b, respectively before being made incident upon the polarization beam splitter 3b. The light paths through which the ± 1-order diffracted beams pass and arranged from the position B to the polarization beam splitter 3b are light paths through which the ± 1-order diffracted beams transmitted from the detection unit 100a have been made incident upon the position B. As a result, the diffracted beams reciprocate on the same light paths. This operation is the same as the operation of the diffracted beams in the detection unit 100a.

As described above, the + 1-order diffracted beam made incident upon the polarization beam splitter 3b is P-polarized beam, while the − 1-order diffracted beam made incident upon the polarization beam splitter 3b is S-polarized beam. Therefore, the + 1-order diffracted beam passes through the polarization beam splitter 3b, while the − 1 diffracted beam is reflected by the polarization beam splitter 3b before the ± 1-order diffracted beams overlap each other via the polarization beam splitter 3b before being made incident upon the λ/4 plate along the common light path.

The two luminous fluxes overlap each other with their plane of polarization intersect each other at right angles. The phase difference δ between the two luminous fluxes is the luminous flux formed by subjecting the two luminous fluxes to 4 times the + 1-order diffractions and 4 times the − 1-order diffractions. Therefore, assuming that the pitch of the diffraction grating 6 is P, and the amount of displacement of the diffraction grating 6 is X, the phase difference δ holds the following relationship:

$$\delta = \frac{2\pi x}{P} \times 4 - \left( -\frac{2\pi x}{P} \times 4 \right) \tag{1}$$

$$= \frac{16\pi x}{P}$$

That is, when x=1P, the phase difference between two fluxes becomes 16π.

The interference beam of the two luminous fluxes which have passed through a ¼ wavelength plate 11 becomes straightly polarized luminous flux which rotates a half rotation in accordance with the displacement of the diffraction grating 6. Therefore, the straight polarized luminous flux passes through the beam splitter 12 and the interference beam which has passed through a polarization plate 13 generates a light and dark change of a period during the half rotation, the dark and light change being transmitted as an electric and periodic signal from the light receiving element 15.

On the other hand, the interference beam reflected by the beam splitter 12 is made incident upon a polarization plate 14. Since the polarization plate 14 is positioned such that its plane of polarization is deviated by 45° with respect to the direction of polarization of the polarization plate 13, the phase of the periodical light and dark change of the interference beam after it has passed through the polarization plate 14 is deviated from the phase of the interference beam which has passed through the polarization plate 13. As a result, the phase of the periodical signal transmitted from the light receiving element 16 deviates from the phase of the periodical signal transmitted from the light receiving element 15 by 90°.

Provided that the number of each of the patterns (the convex patterns) forming the diffraction grating 6 on the disc 101 is N, the phase difference $\delta$ between the two luminous fluxes during a rotation of the disc 101 can be obtained by substituting x=NP into Equation (1), the phase difference $\delta$ becoming as follows:

$$\delta = 16\pi N \quad (2)$$

As can be clearly seen from Equation (2), $16\pi N/2\pi = 8N$ periodical signals (sine wave signals) whose phases are shifted therebetween can be obtained from the light receiving elements 15 and 16.

According to this embodiment, the quantity of rotation of the disc 101 is taken out as periodical signals of the diffraction grating 6 formed on the disc 101 so that the quantity of rotation of the disc 101 is detected by utilizing the thus taken out periodical signals with high resolving power.

As can be clearly seen from FIG. 1, the structure according to this embodiment is formed in such a manner that detection units 100a and 100b are disposed symmetrically with respect to the axis of rotation of the disc 101, and the positions A and B are point-symmetrically disposed with respect to the center of rotation of the disc 101, the positions A and B serving as the subject to be detected, wherein luminous fluxes transmitted from the light source 1 are diffracted at the positions A and B. As a result, an excellent detection accuracy can be obtained even if the center of the disc 101 becomes eccentric with respect to the center of the axis of rotation. As described above, when the luminous fluxes transmitted from the light source 1 are diffracted at a multiplicity of positions in the diffraction grating 6, an excellent detection accuracy can be retained. Therefore, when the structure is constituted in such a manner that three or more positions in the diffraction grating 6 are utilized within an allowable limit of the sensitivities of the light receiving elements 14 and 15, and the diffracted beam is successively transmitted between detection units disposed as illustrated and so as to correspond to each of the positions, the number of the diffractions enabled can be increased and the quantity of rotation of the disc 1 can be detected with an excellent resolving power.

FIGS. 2 to 5 are schematic views and plan views each of which illustrates the other embodiments of the present invention. Referring to the drawings, the same components as those shown in FIG. 1 are given the same reference numerals.

Figure 2:
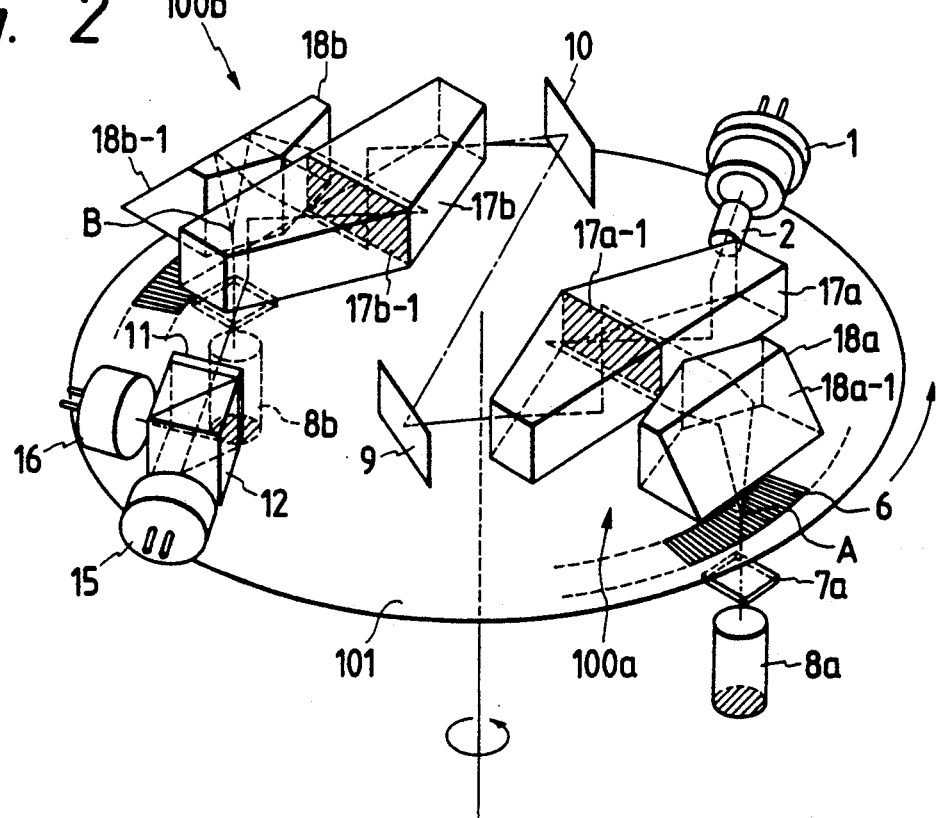
FIG. 2 is a structural view which illustrates a further embodiment of the present invention.

The embodiment shown in FIG. 2 is constituted in such a manner that the optical members such as the mirrors 4a, 5a, 4b, and 5b and the polarization beam splitters 3a and 3b are formed by prisms.

That is, the luminous flux from the light source 1 (or the luminous flux from the detection unit 100a) is divided into two luminous fluxes, P-polarized luminous flux and S-polarized luminous flux, on a photo-division surface 17a-1 (17b-1) of a polarizing prism 17a (17b). The two luminous fluxes are reflected by a reflection surface 18a-1 (18b-1) of a reflection prism 18a (18b) so as to be made incident upon the diffraction grating 6 on the disc 101 at the angle ($\theta$) which corresponds to the diffraction angle of the $\pm$ 1-order diffracted beam.

The other arrangements and the function of the apparatus are the same as the those of the embodiment shown in FIG. 1.

Figure 3:
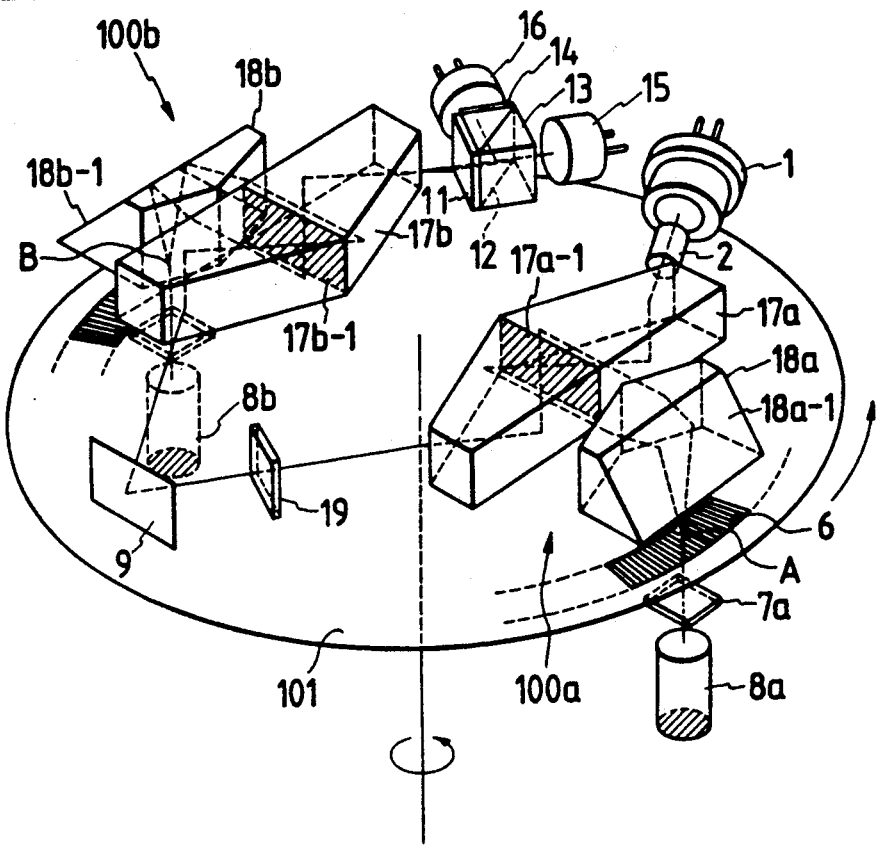
FIG. 3 is a structural view which illustrates a still further embodiment of the present invention.

FIG. 3 is a view which illustrates a modification to the structure shown in FIG. 2, the modification being the change in the arrangement of the portion of the optical members. Referring to FIG. 3, each of the overlapping $\pm$ 1-order re-diffracted luminous fluxes taken from the polarizing prism 17a of the detection unit 100a is caused to pass toward the ½ wavelength plate 19, and the polarization directions of the luminous fluxes are reversed each other via the ½ wavelength plate 19 before being made incident upon the polarizing prism 17b of the detection unit 100b via the mirror 9. As a result, the necessity of providing the mirror 10 can be eliminated, causing the structure of the system provided for the purpose of passing the diffracted luminous fluxes between the detection units to be simplified.

Referring to the drawing, the luminous flux, which has passed through the ½ wavelength plate 19 so as to become S-polarized luminous flux and subjected to the $-$ 1-order diffraction twice, corresponds to the S-polarized component of the luminous flux emitted from the light source 1. On the other hand, the luminous flux, which has passed through the ½ wavelength plate 19 so as to become P-polarized luminous flux and subjected to the $+$ 1-order diffraction twice, corresponds to the P-polarized component of the luminous flux emitted from the light source 1.

According to this embodiment, the luminous flux having the P-polarized component and the luminous flux having the S-polarized component to be made incident upon the polarizing prism 17a are subjected to the diffraction at the diffraction grating 6 twice. They then pass through the ½ wavelength plate 19 so that the luminous flux having the P-polarized component and the luminous flux having the S-polarized component are converted into the luminous fluxes having the original planes of polarization.

According to this embodiment, the components 17a, 18a, 7a, 8a, and 19 are arranged to be a detection unit, and a plurality of the thus constituted detection units are simply and optically connected to each other.

Figure 4:
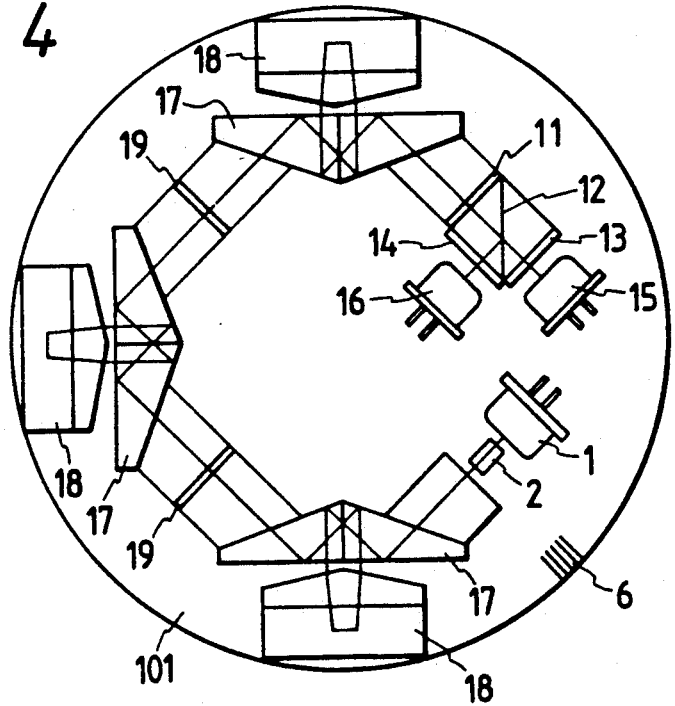
FIGS. 4 and 5 are plan views which illustrate a modification to the encoder shown in FIG. 3.

A structure shown in FIG. 4 is constituted by optically connecting three detection units shown in FIG. 3, where no alphabetical characters are shown to accompany with the reference numerals.

According to this embodiment, the luminous flux having the P-polarized component of the fluxes emitted from the light source 1 is subjected to the $+$ 1-order diffraction in three detection units six times in total. On the other hand, the luminous flux having the S-polarized component are subjected to the $-$ 1-order diffraction in the three detection units six times in total.

The phase difference $\delta$ between the two luminous fluxes to be made incident upon the $\lambda/4$ plate 11 per a movement of the diffraction grating 6 for 1 bit becomes as follows:

$$\delta = 12 \times 2\pi \times n \quad (rad)$$

Figure 5:
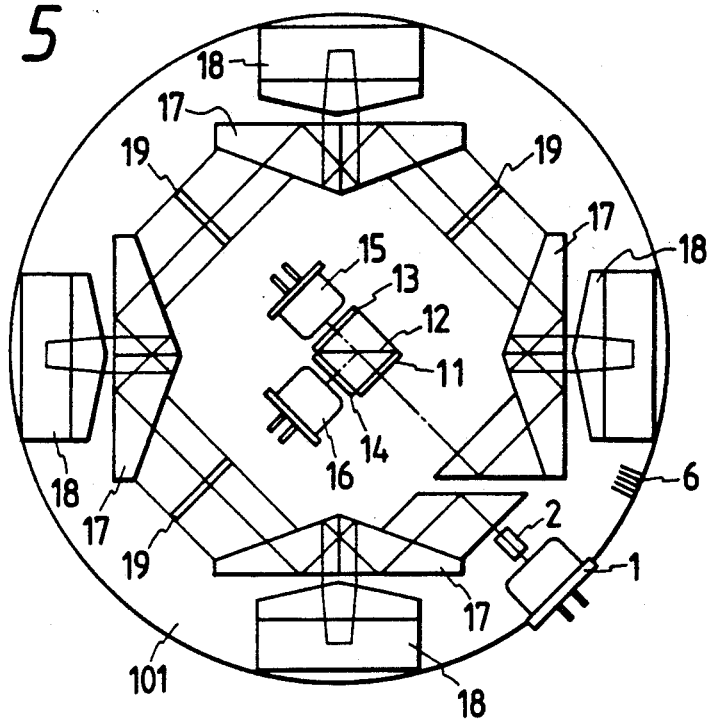

FIG. 5 is a plan view which illustrates a structure arranged such that four detection units shown in FIG. 3 are optically connected to each other.

According to this embodiment, the phase difference of the two luminous fluxes to be made incident upon the π/4 plate 11 per a movement of the diffraction grating 6 for one pitch becomes as follows:

$$\delta = 16 \times 2\pi \times n \text{ (rad)}$$

The shapes of the optical members such as the prisms according to the embodiments shown in FIGS. 2 to 5 are employed as exemplary only. They are not limited to the shapes shown in these drawings, and may be arranged to have the other shapes.

Although the embodiments shown in FIGS. 4 and 5 are arranged so as to increase the number of the diffraction operations conducted, the present invention provides an encoder of the type capable of forming interference beam by interfering the diffracted beams which have been diffracted three times or more. Therefore, the embodiment shown in FIG. 1 may be modified in such a manner that the structure of either the detection unit 100a or 100b is changed so as to diffract the beams at the position A or position B of the diffraction grating 6 only once.

As described in the embodiment shown in FIG. 1, the two luminous fluxes divided by the polarization beam splitter at each of the detection units are made incident upon a predetermined position of the diffraction grating (the position A, B or the like) at the same incident angle from the opposite side. The light paths for the two luminous fluxes are arranged along the common plane of incidence. In this case, reflected beam having a certain intensity is made incident upon the light path through which the luminous flux having the P-polarized component which has passed through the polarization beam splitter passes, the light having the certain intensity being generated as a result of the regular reflection of the luminous flux having the S-polarized component reflected by the polarization beam splitter. On the other hand, reflected beam having a certain intensity is made incident upon the optical path through which the luminous flux having the S polarized component which has passed through the polarization beam splitter passes, the beam having the certain intensity being generated as a result of the regular reflection, which has been taken place at the diffraction grating, of the luminous flux having the P-polarized component which has passed through the polarization beam. As a result, the above-described reflected beams are, together with the interference beam, made incident upon the light receiving elements. These reflected beams are, so-called ghost beams which deteriorate the accuracy in measuring the displacement of the diffraction grating, that is, the quantity of rotation of the disc in accordance with the output signal from the light receiving element. The influence of the ghost beams becomes further critical in proportion to the number of the detection units.

The problem above can be easily overcome by causing the two luminous fluxes from the polarization beam splitter to pass toward the diffraction grating.

Figure 6:
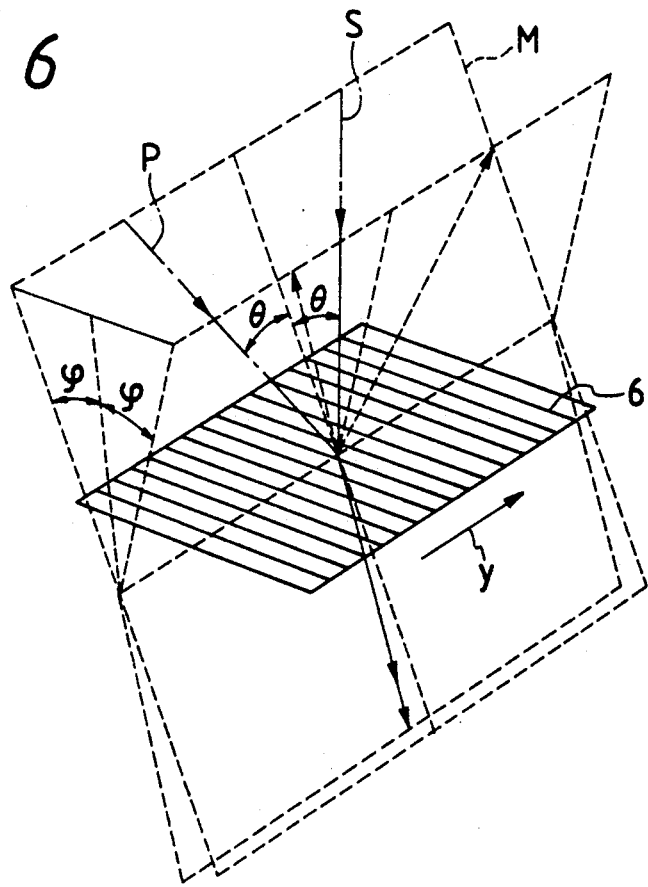
FIGS. 6, 7A, and 7B are views which illustrate another embodiment of the present invention.
Figure 7A:
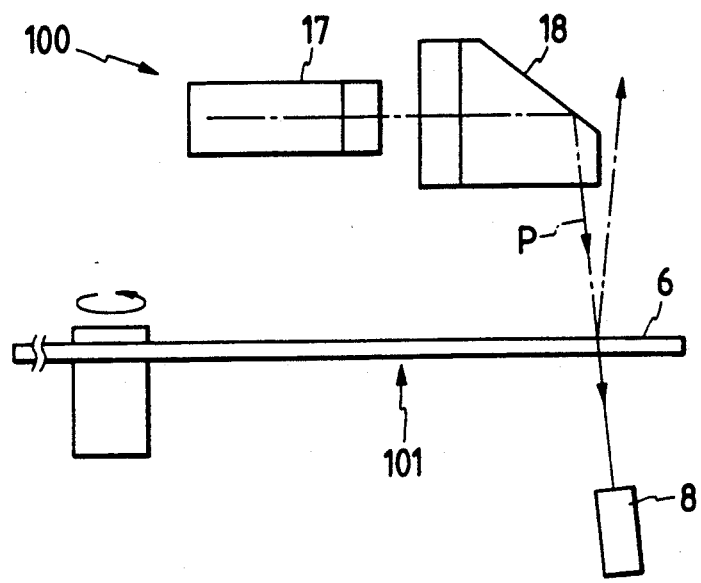
Figure 7B:
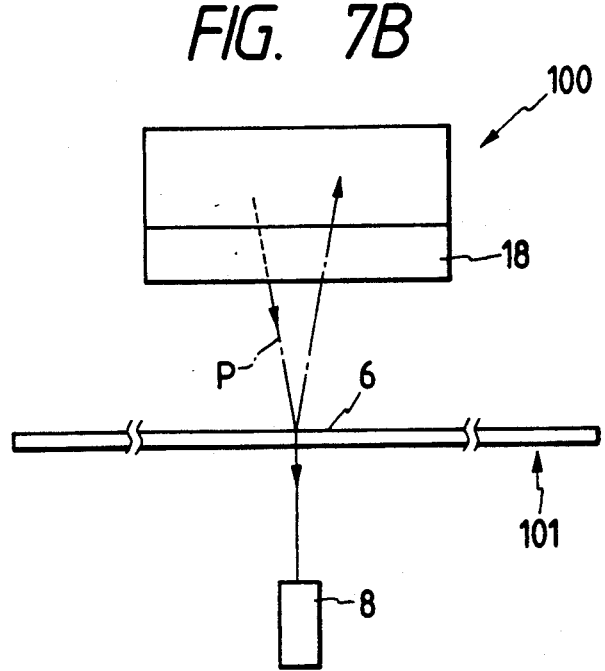

Referring to FIG. 6, reference numeral 6 represents the diffraction grating, symbol P represents a luminous flux having P-polarized component which has passed through the polarization beam splitter, and S represents a luminous flux having the S-polarized component which has been reflected by the polarization beam splitter. According to the embodiment described above, the plane of incidence including luminous fluxes P and S is arranged to coincide with the plane including an axis which is perpendicular to the diffraction grating 6 (the surface of the disc) and an axis running parallel to direction y in which the diffraction grating 6 are arranged. However, according to this embodiment, incident plane M is disposed diagonally by angle ψ relative to the axis running parallel to the direction y with respect to a reference plane. Luminous fluxes P and S made incident upon the diffraction grating 6 along the slanted incident plane M are not incident upon the other light path even if they are reflected by the diffraction grating 6. For example, as shown in FIGS. 7A and 7B, the regular reflected beam which is the ghost beam can be emitted outside the prism 18 (which corresponds to 18a and 18b shown in FIG. 2) of the detection unit 100 by determining the angle ψ to a suitable degree.

Therefore, the quantity of rotation of the disc 101 can be detected accurately by constituting the detection units of the encoder according to the above-described embodiments in such a manner that each of the luminous fluxes is caused to make incident upon the diffraction grating. In the case where the subject to be measured is a linear scale as an alternative to the rotary scale such as the disc 101, the technology according to the above-described embodiments can, of course, be applied, resulting in the same effects.

As described above, according to the aspects of the encoder described above, its structure is arranged in such a manner that a plurality of detection units are disposed and are structured so as to conduct the same sign-diffractions by the diffraction grating plural times. As a result, high resolving power can be realized. Furthermore, an accurate rotary encoder can be provided by arranging its structure in which the diffractions are conducted at a plurality of the circumferential positions of the disc, the rotary encoder being capable of averaging the apparent change in the pitch of the gratings at the incident point of the luminous fluxes due to the relative eccentricity between the center of the disc and the axis of rotation or the non-uniform pitch of the grating of the diffraction grating.

According to the present invention, a further effect can be obtained in that the provisions of the optical paths can be readily conducted by arranging its structure in such a manner that a plurality of detection units are optically connected to one another. Therefore, assembling and adjusting operations can be readily conducted. In addition, the structure formed in which optical isolation utilizing the polarization beam splitter and λ/4 plate can be conducted in every detection unit can reduce the loss in the light quantity due to divisions or couplings of the luminous fluxes, causing the S/N ratio of the signal from the light receiving element to be improved.

What is claimed is:
1. A method for detecting a state of rotation of a rotary scale having a diffraction grating formed thereon and along the direction of rotation said rotary scale, said method comprising the steps of:
a first generating step in which a radiation beam is caused to pass toward a first place on said diffraction grating in which a first and a second diffracted beam are generated;
a second generating step in which said first and second diffracted beams are again diffracted at said first place and a first re-diffracted beam is gener- ated from said first diffracted beam and a second re-diffracted beam is generated from said second diffracted beam;

a step in which said first and second re-diffracted beams are superimposed to be directed to a second place of said diffraction grating which is substantially opposed to said first place with respect to the center of rotation of said rotary scale through a predetermined common beam path;

a step in which an interference beam is formed by causing a diffracted beam generated by diffracting said first re-diffracted beam and a diffracted beam generated by said second-rediffracted beam to interfere with each other at said second place; and a step in which said state of rotation of said rotary scale is detected by converting said interference beam into a signal.

2. A method according to claim 1, wherein said first diffracted beam is a diffracted beam of a predetermined positive order, said second diffracted beam is a diffracted beam of a predetermined negative order, said first re-diffracted beam is a diffracted beam of said predetermined positive order, said second re-diffracted beam is a diffracted beam of said predetermined negative order, and when said interference beam is formed, a diffracted beam of said predetermined positive order is generated from said first re-diffracted beam, and a diffracted beam of said predetermined negative order is generated from said second re-diffracted beam, so that said interference beam is formed from said diffracted beams.

3. A method according to claim 2, wherein said predetermined positive order and said predetermined negative order are 1-orders.

4. A method according to claim 3, wherein said first generating step is carried out in such a manner that said first and second diffracted beams are emitted from said first place in the same direction with substanial overlap.

5. A method according to claim 4, wherein said step in which said first and second re-diffracted beams are caused to pass toward said second place is carried out in such a manner that each of said diffracted beams from said first and second re-diffracted beams is emitted from said second place in the same direction with substantially overlap.

6. A method according to claim 5, wherein said second generating step includes a step in which said first and second diffracted beams are caused to pass toward said first place overlapped with each other.

7. A method according to claim 6, wherein said step in which said interference beam is formed comprises the steps of:

a step in which each of said diffracted beams formed from said first and second re-diffracted beams is caused to pass toward said second place substantially overlapped with each other; and a step in which said interference beam is formed by causing said first positive diffracted beam formed from said first re-diffracted beam and said first negative diffracted beam formed from said second re-diffracted beam which are generated as a result of diffraction of each of said diffracted beams at said second place to interfere with each other.

8. A method according to claim 7, wherein said first generating step supplies a laser beam as said radiation beam.

9. An encoder for detecting a state of rotation of a rotary scale on which a diffraction grating is formed along the direction of rotation, comprising:

means for directing a pair of radiation beams toward a first place of said diffraction grating from different direction from each other, and emitting a positive diffracted beam formed from one of said pair of radiation beams and a negative diffracted beam formed from the other of said pair of radiation beams from said first place so as to be substantially superimposed with each other;

first reflection means for reflecting said positive and negative diffracted beams to substantially the same direction as the incident direction irrespective of the fluctuation of the incident angles so as to be made re-incident on said first place, wherein a first positive diffracted beam is generated by said positive diffracted beam being diffracted and a second negative diffracted beam is generated by said negative diffracted beam being diffracted;

re-incident means for receiving said first and second diffracted beams through said directing means and and superimposing them to be led through a predetermined common path so that said first and second diffracted beams are made re-incident on a second place of said diffraction grating which is opposed to said first place with respect to the center of rotation of said scale from different directions from each other, wherein a first positive rediffracted beam is generated by said first diffracted beam being diffracted and a second negative re-diffracted beam is generated by said second diffracted beam being diffracted, and said first and second diffracted beams are substantially superimposed on each other to exit from said second place;

second reflection means for reflecting said first and second re-diffracted beams to substantially the same direction as the incident direction irrespective of the incident angles so as to be made re-incident on said second place, wherein a predetermined plurality of diffracted beams are generated by said first and second re-diffracted beams being diffracted; and means for forming, via said re-incident means, an interference beam by using a positive diffracted beam formed from said first re-diffracted beam and a negative diffracted beam formed from second re-diffracted beam, and converting said interference beam into a signal.

10. An encoder according to claim 9, wherein said means capable of causing a pair of radiation beams to pass comprises:

a semiconductor laser:

a first polarization beam splitter capable of dividing a laser beam emitted from said semiconductor laser and generating said pair of said radiation beams;

a first optical system capable of making incident said pair of said radiation beams from said polarization beam splitter upon said place inclined by a predetermined angle with respect to a perpendicular axis of the surface of said rotary scale, said first reflection means including a mirror and a ¼ wavelength plate disposed between said mirror and said rotary scale, wherein said first and second diffracted beams are caused to pass toward said re-incident means along a common light path via said optical system and said first polarization beam splitter overlapped with each other.

11. An encoder according to claim 10, wherein said re-incident means comprises:
   a second polarization beam splitter;
   means capable of causing said first and second diffracted beams overlapped with each other to pass toward said polarization beam splitter and capable of separating said first and second diffracted beams from each other;
   a second optical system capable of making said first and second diffracted beams to said second place in such a manner that said first and second diffracted beams are inclined with respect to a perpendicular axis of the surface of said scale by a predetermined angle, said second reflection means including a mirror and a ¼ wavelength plate disposed between said mirror and said rotary scale, wherein said first and second re-diffracted beams are caused to pass toward said conversion means overlapped with each other via said second optical system and said polarization beam splitter along a common light path.

12. An encoder according to claim 11, wherein said conversion means includes a ¼ wavelength plate, a polarizing plate, and a photo-detector, whereby said first and second re-diffracted beams which have passed through said ¼ wavelength plate are received by said photo-detector via said polarizing plate so as to photo-electrically coverts said interference beam made incident upon said photo-detector and to transmit said signal.

13. An encoder according to claim 12, wherein said positive and negative diffracted beams, said first and second diffracted beams, said first and second re-diffracted beams, a positive diffracted beam formed from said first re-diffracted beam, and a negative diffracted beam formed from said second re-diffracted beam are of a predetermined order.

14. A method according to claim 13, wherein said predetermined positive order and said predetermined negative order are arranged to be 1-orders.

15. An encoder according to claim 14, wherein each of said positive and negative diffracted beams, said first and second diffracted beams, said first and second re-diffracted beams, the positive diffracted beam formed from said first re-diffracted beam, and the negative diffracted beam formed from said second re-diffracted beam is a beam which has passed through said diffraction grating.

16. An encoder according to claim 14, wherein said means capable of causing a pair of radiation beams to pass comprises means capable of converting said laser beam emitted from said laser into parallel beams so as to be caused to pass toward said first polarization beam splitter.

17. An encoder capable of detecting a state of rotation of a rotary scale having a diffraction grating formed along the direction of rotation of said rotary scale, said encoder comprising:
   first generating means capable of causing a radiation beam to pass toward a first place of said diffraction grating and capable of generating a first and a second diffracted beam at said first place, each of said first and second diffracted beams have been diffracted plural times;
   means for superimposing said first and second diffracted beams through a predetermined common path to be directed toward a second place of said diffraction grating which is substantially opposed to said first place with respect to the center of rotation of said rotary scale; and
   means capable of converting an interference beam into a signal, said interference signal being formed from a first re-diffracted beam generated as a result of diffraction of said first diffracted beam at said second place and a second re-diffracted beam generated as a result of diffraction of said second diffracted beam at said second place.

18. An encoder according to claim 17, wherein said first diffracted beam is formed from a positive diffracted beam formed by diffracting, at said first place, a positive diffracted beam which has been diffracted at said first place, while said second diffracted beam is formed from a negative diffracted beam formed by diffracting, at said first place, a negative diffracted beam which has been diffracted at said first place, and
   said first re-diffracted beam is formed from a positive diffracted beam, while said second re-diffracted beam is formed from a negative diffracted beam.

19. An encoder capable of detecting a state of rotation of a rotary scale having a diffraction grating formed along the direction of rotation of said rotary scale, said encoder comprising:
   first generating means capable of causing a radiation beam to pass toward a first place of said diffraction grating, and generating a first and a second diffracted beam;
   second generating means for superimposing said first and second diffracted beams through a predetermined common beam path to be directed toward a second place of said diffraction grating which is substantially opposed to said first place with respect to the center of rotation of said rotary scale, and for causing said first and second diffracted beams to be diffracted plural times at said second place so that a first re-diffracted beam is generated from said first diffracted beam and a second re-diffracted beam is generated from said second diffracted beam; and
   means capable of converting an interference beam formed by said first and second re-diffracted beams into a signal.

20. An encoder according to claim 19, wherein said first diffracted beam is a positive diffracted beam, said second diffracted beam is a negative diffracted beam, said first re-diffracted beam is formed from a positive diffracted beam which is formed by diffracting, at said second place, a positive diffracted beam formed by diffracting said first diffracted beam at said second place, and said second re-diffracted beam is formed from a negative diffracted beam which is formed by diffracting, at said second place, a negative diffracted beam which is formed by diffracting said second diffracted beam at said second place.

21. A method for measuring the displacement of a diffraction grating comprising the steps of:
   a step in which a first radiation beam and a second radiation beam are directed toward said diffraction grating rom different directions from each other along first and second beam paths which substantially intersect at a predetermined position on said diffraction grating;
   a step in which a first diffracted beam generated by said first radiation beam being diffracted and a second diffracted beam generated by said second radiation beam being diffracted are reflected to substantially the same direction as the incident direction irrespective of the fluctuation of the diffraction angles and directed toward said position so as to be made re-incident on the same position;

a step in which a first re-diffracted beam generated by diffracting said first diffracted beam at said predetermined position is caused to pass toward said first beam path and a second re-diffracted beam generated by diffracting said second diffracted beam at said predetermined position is caused to pass toward said second beam path: and a step in which an interference beam is formed by causing said first and second re-diffracted beams to interfere with each other, and said interference beam is converted into a signal, so that said displacement is measured, wherein said step in which said radiation beam is caused to pass is carried out in such a manner that a reflected beam generated from a reflection of said first radiation beam at said diffraction grating is not made incident upon said second beam path, and a reflected beam generated from a reflection of said second radiation beam at said diffraction grating is not made incident upon said first beam path.

22. A method according to claim 21, wherein said step in which said radiation beam is caused to pass is carried out in such a manner that said first and second diffracted beams are emitted substantially overlapped with each other from said place, and said step in which said diffracted beam is caused to pass is carried out in such a manner that said first and second diffracted beams are overlapped with each other.

23. A method according to claim 22, wherein said step in which said radiation beam is caused to pass is carried out in such a manner that said first diffracted beam becomes a $+1$ order diffracted beam and said second diffracted beam becomes a $-1$ order diffracted beam.

24. a method according to claim 22, wherein said diffraction grating and gratings of the diffraction grating run in predetermined directions and said step in which said radiation beam is caused to pass is carried out in such a manner that said first and second beam paths are determined along a plane which is inclined with respect to a plane including an axis perpendicular to a plane on which said diffraction grating is displaced and an axis running parallel to the predetermined direction of the gratings of said diffraction grating and the predetermined direction of said diffraction grating.

25. An apparatus capable of measuring the displacement of a diffraction grating comprising:
a radiation source;
means capable separating a radiation beam emitted from said radiation source into a first and second beams so as to be applied to a predetermined place of said diffraction grating along an individual first and a second beam path, said first and second beam paths substantially intersecting each other at said place, and said means causing said first and second beams to pass toward said place in such a manner that a reflected beam generated from a reflection of said first beam at said diffraction grating is not made incident upon said second beam path and a reflected beam generated from a reflection of said second beam at said diffraction grating is not made incident upon said first beam path;
reflection means for reflecting a first positive diffracted beam generated by said first beam being diffracted at said place and a second negative diffracted beam generated by said second beam being diffracted at said place toward substantially the incident direction irrespective of the fluctuation of the incident angles so as to cause each of said diffracted beams to be re-incident on said place, wherein a first positive re-diffracted beam is generated toward said first beam path by said first diffracted beam being diffracted at said place and a second negative re-diffracted beam is generated toward said second beam path by said second diffracted beam being diffracted at said place; and
conversion means capable of converting an interference beam formed by said first positive re-diffracted beam and said second negative re-diffracted beam into a signal.

26. an apparatus according to claim 25, wherein
said diffraction grating and gratings of the diffraction grating run in predetermined directions; and
said radiation source applies said first and second beams to said place along a plane which is inclined with respect to a plane including an axis which perpendicularly intersects a plane on which said diffraction grating is displaced and an axis which runs parallel to the predetermined direction of the gratings of said diffraction grating and the predetermined direction of said diffraction grating.

27. An apparatus according to claim 26, wherein said radiation source comprises a polarization beam splitter capable of conducting said separation and an optical system capable of receiving said first and second beams from said polarization beam splitter, and determining said first and second optical paths, said first beam having a first polarizing direction and said second beam having a second polarizing direction different from the first polarizing direction.

28. An apparatus according to claim 27, wherein said reflection means comprises a mirror and a ¼ wavelength plate disposed between said mirror and said diffraction grating, whereby the direction of polarization of said first positive re-diffracted beam is caused to be perpendicular to the direction of polarization of said first diffracted beam and the direction of polarization of said second negative re-diffracted beam is caused to be perpendicular to the direction of polarization of said second diffracted beam.

29. An apparatus according to claim 28, wherein said first positive and second negative re-diffracted beams are overlapped with each other via said optical system said polarization beam splitter, and said conversion means comprises:
a ¼ wavelength plate capable converting each of said re-diffracted beam supplied from said polarization beam splitter into circularly polarized beams; and
a photo-detection element capable causing each of said re-diffracted beams supplied from said 1/4 wavelength plate to pass toward a photo-detector, said each of said re-diffracted beams being caused to pass in the form of said interference beam, whereby said photo-detector transmits a signal in accordance with the displacement of said diffraction grating upon receipt of said interference beam.

30. An apparatus according to claim 29, wherein said radiation source comprises a semiconductor laser.

31. An apparatus according to claim 30, wherein said optical system of said radiation means determines said first and second light paths so as to cause said first and said second diffracted beams to be emitted from said place overlapped with each other.

32. An apparatus according to claim 31, wherein said first positive diffracted beam and said first re-diffracted beam are respectively determined to be + 1 order diffracted beam, while said second negative diffracted beam and said second re-diffracted beam are respectively determined to be − 1 order diffracted beam.

33. An apparatus according to claim 26, wherein said conversion means comprises:
means capable of causing said first positive and said second negative re-diffracted beams to pass toward another place of said diffraction grating which is different from said place; and
a detector capable of receiving an interference beam formed by a diffraction beam of a predetermined positive order formed by diffracting said first positive re-diffracted beam at said place and a diffraction beam of a predetermined negative order formed by diffracting said second negative re-diffracted beam, and transmitting a signal which corresponds to the displacement of said diffraction grating.

34. An apparatus according to claim 26, wherein said radiation source comprises:
means capable of causing said radiation beam to another place of said diffraction grating which is different from said place; and
means capable of overlapping diffracted beams of positive and negative orders generated at said another place, causing said light paths for said diffraction beams to be a common light path, and causing each of said diffracted beams to pass toward said radiation means.

* * * * *

UNITED STATES PATENT AND TRADEMARK OFFICE
CERTIFICATE OF CORRECTION

PATENT NO. : 5,017,777  
DATED : May 21, 1991  
INVENTOR(S) : KOH ISHIZUKA ET AL.

Page 1 of 2

It is certified that error appears in the above-identified patent and that said Letters Patent is hereby corrected as shown below:

COLUMN 8

Line 33, "splitter 36" should read --splitter 3b--.

COLUMN 12

Line 7, "angle $\psi$" should read --angle $\varphi$--.
Line 17, "angle $\psi$" should read --angle $\varphi$--.
Line 60, "rotation said" should read --rotation of said--.

COLUMN 13

Line 13, "second-rediffracted" should read --second re-diffracted--.
Line 46, "tially" should read --tial--.

COLUMN 14

Line 6, "direction" should read --directions--.
Line 47, "from second" should read --from said second--.

COLUMN 15

Line 28, "coverts" should read --convert--.

COLUMN 16

Line 60, "rom" should read --from--.

UNITED STATES PATENT AND TRADEMARK OFFICE
CERTIFICATE OF CORRECTION

PATENT NO. : 5,017,777

DATED : May 21, 1991

INVENTOR(S) : KOH ISHIZUKA ET AL.

It is certified that error appears in the above-identified patent and that said Letters Patent is hereby corrected as shown below:

COLUMN 17

Line 38, "a" should read --A--.
    Line 53, "a" should be deleted.

COLUMN 18

Line 16, "an" should read --An--.
    Line 49, "said polarization" should read
        --and said polarization--.
    Line 52, "beam" should read --beams--.

COLUMN 20

Line 7, "became to an-" should read
        --beam to pass toward an---.

Signed and Sealed this

Twenty-sixth Day of January, 1993

Attest:

STEPHEN G. KUNIN

Attesting Officer    Acting Commissioner of Patents and Trademarks